(12) United States Patent
Greaves et al.

(10) Patent No.: US 9,072,346 B2
(45) Date of Patent: Jul. 7, 2015

(54) BUCKLE

(75) Inventors: John Greaves, Romsey (GB); Martin Roberts-Jones, Chandlers Ford (GB)

(73) Assignee: WILLANS MARQUES LIMITED, Oxfordshire (GB)

( * ) Notice: Subject to any disclaimer, the term of this patent is extended or adjusted under 35 U.S.C. 154(b) by 165 days.

(21) Appl. No.: 13/521,814

(22) PCT Filed: Jan. 13, 2011

(86) PCT No.: PCT/GB2011/000035
§ 371 (c)(1),
(2), (4) Date: Jul. 12, 2012

(87) PCT Pub. No.: WO2011/086348
PCT Pub. Date: Jul. 21, 2011

(65) Prior Publication Data
US 2012/0284966 A1  Nov. 15, 2012

(30) Foreign Application Priority Data
Jan. 13, 2010 (GB) .................................. 1000531.2

(51) Int. Cl.
*A44B 11/25* (2006.01)
*B60R 22/00* (2006.01)

(52) U.S. Cl.
CPC ......... *A44B 11/2511* (2013.01); *Y10T 24/4016* (2015.01); *Y10T 24/45613* (2015.01);
(Continued)

(58) Field of Classification Search
CPC .................................................. A44B 11/2511
USPC .............. 24/170, 177, 573.11, 602, 632, 634, 24/635, 631, 639
See application file for complete search history.

(56) References Cited

U.S. PATENT DOCUMENTS 2,641,813 A   6/1953  Loxham
3,106,004 A * 10/1963  Davis .............................. 24/632
(Continued)

FOREIGN PATENT DOCUMENTS

DE   3302301   7/1984
FR   1298012   7/1962
(Continued)

OTHER PUBLICATIONS

International search report dated Jul. 20, 2011 in corresponding PCT/GB2011/000035.
(Continued)

*Primary Examiner* — Robert J Sandy
*Assistant Examiner* — Louis Mercado
(74) *Attorney, Agent, or Firm* — Young & Thompson

(57) ABSTRACT

A buckle for use with a safety harness includes a plurality of slots each for receiving an end of a harness belt section, each slot having associated therewith a retainer which is moveable into and out of engagement with an abutment surface defined by the end of a belt section, first bias elements normally to urge the retainers to move to a position at which they each engage with an abutment surface of the end of a belt section following insertion into a slot, at least one of the retainers having associated therewith a lever which is pivotable against the action of the first bias elements to move the retainer to a release position at which it is free from engagement with the abutment surface, and an actuation member operable to act on the or each lever whereby the or each lever moves a retainer to the release position.

18 Claims, 10 Drawing Sheets

(52) U.S. Cl.
CPC ......... *A44B11/2542* (2013.01); *A44B 11/2569* (2013.01); *Y10T 24/45634* (2015.01); *Y10T 24/45618* (2015.01); *Y10T 24/45628* (2015.01); *Y10T 24/45654* (2015.01); *B60R 22/00* (2013.01); *A44B 11/2534* (2013.01)

(56) References Cited

U.S. PATENT DOCUMENTS

| | | | | |
|---|---|---|---|---|
| 3,510,921 | A | * | 5/1970 | Gillmore .......................... 24/632 |
| 3,523,342 | A | * | 8/1970 | Spires ............................. 24/632 |
| 3,587,141 | A | * | 6/1971 | Brown ............................. 24/632 |
| 3,747,167 | A | * | 7/1973 | Pravaz ........................ 24/573.11 |
| 5,086,548 | A | * | 2/1992 | Tanaka et al. .................... 24/632 |
| 5,432,987 | A | * | 7/1995 | Schroth ............................ 24/632 |
| 7,065,843 | B1 | * | 6/2006 | Wu .................................. 24/642 |
| 7,159,284 | B2 | * | 1/2007 | Gastaldi ........................... 24/633 |
| 7,716,794 | B2 | * | 5/2010 | Wu ............................. 24/579.11 |
| 8,631,545 | B2 | * | 1/2014 | Ford et al. ....................... 24/602 |
| 2009/0038125 | A1 | | 2/2009 | Wu |
| 2013/0212845 | A1 | * | 8/2013 | Ford et al. ....................... 24/602 |

FOREIGN PATENT DOCUMENTS

| | | |
|---|---|---|
| GB | 587082 | 4/1947 |
| GB | 822857 | 11/1959 |
| GB | 2450766 | 1/2009 |
| WO | 2007030865 | 3/2007 |

OTHER PUBLICATIONS

International search report dated May 11, 2010 in corresponding GB1000531.2.

* cited by examiner

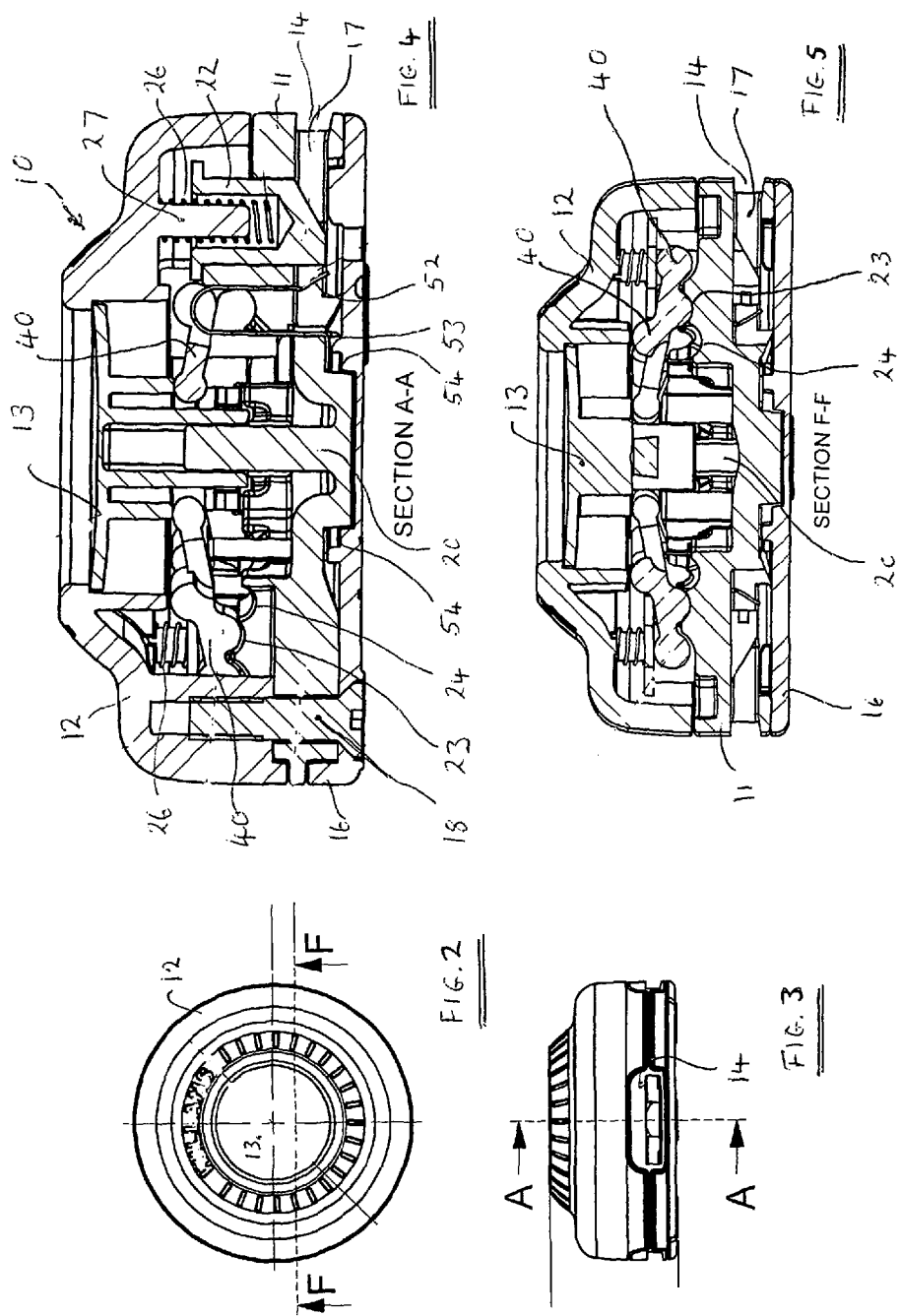

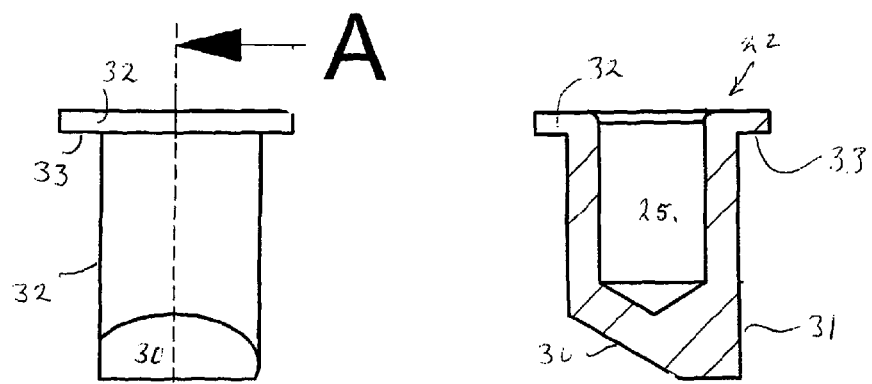
FIG. 8   A-A FIG. 9
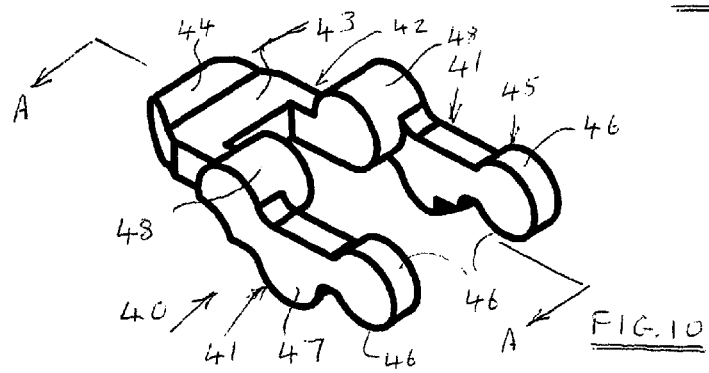
FIG. 10
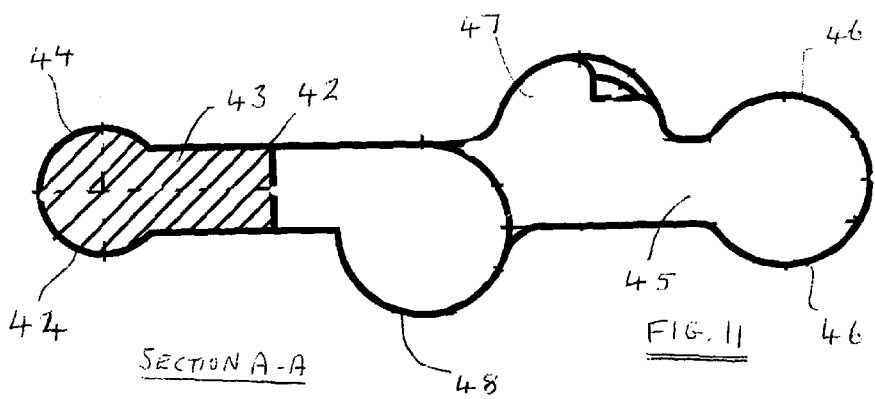
SECTION A-A   FIG. 11

BUCKLE

This invention relates in particular, though not exclusively, to a safety buckle which enables the ends of two or more belt sections of a vehicle safety harness readily to be connected together and separated. The invention relates also to a buckle which enables two or more sections of other types of harness or connectable retainers, such as load straps, readily to be connected together and to be separated.

BACKGROUND OF THE INVENTION

Particularly in the field of motor racing it is conventional for a driver to wear a so-called four or six point safety harness. In the case, for example, of a six point harness two crutch portions of the harness are joined together such that there are five separate belt sections the ends of which may be connected together by means of a buckle when the driver is seated in the vehicle. Typically the buckle is non-releasably attached to the end of one belt section and is able releasably to receive and inter-connect the other four belt ends. Each of at least the releasable belt ends conventionally is provided with a rigid end member in the form of a tongue which is apertured or otherwise shaped to define an abutment surface against which a retainer within the buckle can bear selectively to prevent removal of the tongue until a release mechanism is activated.

Legislation and conventional practices have dictated that the design of a buckle for motor racing purposes shall be of a type in which release is effected by rotation of a release arm lever. Also that the release arm shall be biased to a datum position and shall effect release only when rotated from the datum position through more than a pre-determined angle.

The requirement for a release arm type operation is a feature which distinguishes the safety harness buckles used for motor racing purposes from those for a vehicles used on public roads. For public road use it is required, at least within the European Union, that release is to be effected by depressing a button or similar component of the buckle.

The currently known constructions for buckles for motor racing vehicles are relatively heavy as compared with those for road vehicles, in part reflecting the requirement for release arm type operation, and also are relatively expensive to produce.

An example of a known construction is described in EP-1514409 A2.

The present invention seeks to provide an improved buckle suitable for use in motor racing vehicles and which is lighter in weight and/or cheaper to produce than hitherto known buckle of the release arm type.

Another aspect of the present invention seeks to provide a buckle which is suitable for actuation by either a rotatable release arm or a depressible release member such as a push button.

SUMMARY OF THE INVENTION

In accordance with the present invention a buckle for use with a safety harness comprises a plurality of slots each for receiving an end of a harness belt section, each slot having associated therewith a retainer which is moveable into and out of engagement with an abutment surface defined by the end of a belt section, first bias means normally to urge the retainers to move to a position at which they each engage with a said abutment surface of the end of a belt section following insertion into a slot, at least one of said retainers having associated therewith a lever which is pivotable against the action of the first bias means to move the retainer to a release position at which it is free from engagement with a said abutment surface, and an actuation member, said actuation member being operable to act on the or each lever whereby the or each lever is caused to move a retainer to said release position.

Preferably said actuation member is moveable axially in a direction parallel with movement of the retainers under the action of the first bias means.

Preferably the actuation member is operable to act simultaneously on each of a plurality of levers.

Said first bias means may act commonly on each of a plurality of retainers or an individual first bias means may be provided for each retainer.

The first bias means may act via a said lever to bias the actuation member in a first direction or may act substantially directly on the actuation member.

The ends of the or each lever may be secured pivotally to the actuation member and/or a retainer such that, irrespective of any forces exerted by the first bias means, the movement of an end of the lever will correspond with movement of the actuation member and/or retainer which is secured pivotally.

More preferably, however, and to seek to reduce costs and weight, the ends of a lever may bear against abutment surfaces defined by the retainer and actuation member without being pivotally secured relative thereto. In this case it is preferred that the or each retainer has an independent first bias means associated therewith. Optionally, and particularly in the case of a buckle of the type having an actuation member in the form of an external release arm, a second bias means may be provided to act on the actuation member to provide a bias force which tends to resist movement of the actuation member away from a datum position and to a position at which a retainer is caused, via a lever, to move into the release position.

The buckle may comprise a body portion which at least in part provides support and guidance for each of the retainers, the lever(s) and, optionally, also the actuation member. The body may define at least in part said slots.

The buckle additionally may comprise ejector means, such as one or more springs, arranged positively to eject a belt end from a slot when the retainer at that slot is moved to a release position.

The or each lever preferably is of the first class type, i.e. of the type having a pivot position between the operative ends thereof. The buckle body preferably is provided with a part cylindrical recess or like formation to act as fulcrum for pivotal movement of a pivot position of the lever. The pivot position of the lever may be off-set from a position mid way between operative ends of the lever and the body may define two fulcrum positions for the lever whereby reversal of orientation of the lever and positioning it in a different one of two fulcrum positions enables the force exerted on each retainer for a given force of the actuation member to be changed. Alternatively or additionally each lever may be provided with two pivot positions each off-set from a position mid way between operative ends of the lever and either of which can be positioned in a fulcrum position of the body similarly to enable the force exerted on each retainer for a given force on the actuation member to be changed.

The or each lever may be provided with three or more pivot positions and, optionally, one may be positioned mid way between operative ends of the lever. It is envisaged also that the body portion may be provided with three or more fulcrum positions each at different spacings from a retainer.

Said body portion may provide at least in part support and/or guidance for the first bias means. Alternatively or additionally the first bias means may be supported and guided by a top cover member secured to said body. Said top cover may provide at least in part support and guidance for the actuation member.

For a buckle which is required to be of the push button type the actuation member serves as an externally operable release button.

For a buckle which is required to be of the release arm type the top cover and/or body of the buckle mechanism may provide support for a release lever which is angularly rotatable about a central pivot axis parallel with the direction of movement of the actuation member. In this case a cam mechanism may be provided between the release arm and actuation member in order to convert rotation of the release arm into axial movement of the actuation member. Thus the top cover of a buckle of the release arm type typically may be of a shape and/or construction which differs from that of the top cover of a buckle of the push button type release, but the remainder of the components of the push operated type may be employed for providing a release arm version.

For the release arm type of buckle preferably a release arm bias means is provided to bias the arm to a datum position from which it is rotatable either clockwise or anti-clockwise against the bias force.

The cam mechanism may be of a kind which allows the arm to be rotated through an initial angle of clockwise or anti-clockwise movement without causing any axial movement of the actuation member, or any axial movement sufficient to move a retainer to a retracted position, and to move the actuation member axially and effect movement of a retainer to a retracted position only when the arm is moved from the datum position through more than that initial angle.

The body portion of the buckle may define wholly or only in part each of the slots for receiving a belt end. The slots may be defined by the body portion of the buckle and a bottom cover plate.

The body may be formed by casting or moulding, e.g. of metal or plastics, and thereby obviating the need for more expensive and extensive machining operations.

Fasteners, such as screw fittings may be employed to extend through that plate and engage with a top cover member in an arrangement in which the body portion is securely sandwiched between the top cover member and bottom cover plate.

Although each retainer of the buckle may be retractable in the aforedescribed manner, the invention provides that the buckle may comprise at least one retainer which is not retractable such that at least one belt end may be non-releasably secured to the buckle. The construction of the present invention allows this readily to be achieved by the simple expedient of omitting to provide a lever for the or each retainer which is to be non-retractable. If the buckle is of a construction as described in the preceding paragraph the change of status of any retainer may be achieved relatively simply by unscrewing the top cover to allow removal or insertion of a lever as appropriate. A further feature of a buckle of the present invention is that it will securely retain belt ends even if not all of the slots are engaged by a belt end.

BRIEF DESCRIPTION OF THE DRAWINGS

Embodiments of the present invention will now be described, by way of example only, with reference to the accompanying diagrammatic drawings in which:—

FIG. 2 is a plan view of the buckle of FIG. 1;

FIG. 3 is a side view of the buckle of FIG. 2;

FIG. 4 is a section on the line A-A of FIG. 3;

FIG. 5 is a section on the line F-F of FIG. 2;

FIG. 8 is a side view of a retention pin;

FIG. 9 is a section on the line A-A of FIG. 8;

FIG. 10 is a perspective view of a lever of the harness mechanism;

FIG. 11 is a section on the line A-A of FIG. 10 and shown inverted;

DETAILED DESCRIPTION OF THE PREFERRED EMBODIMENTS

Figure 1:
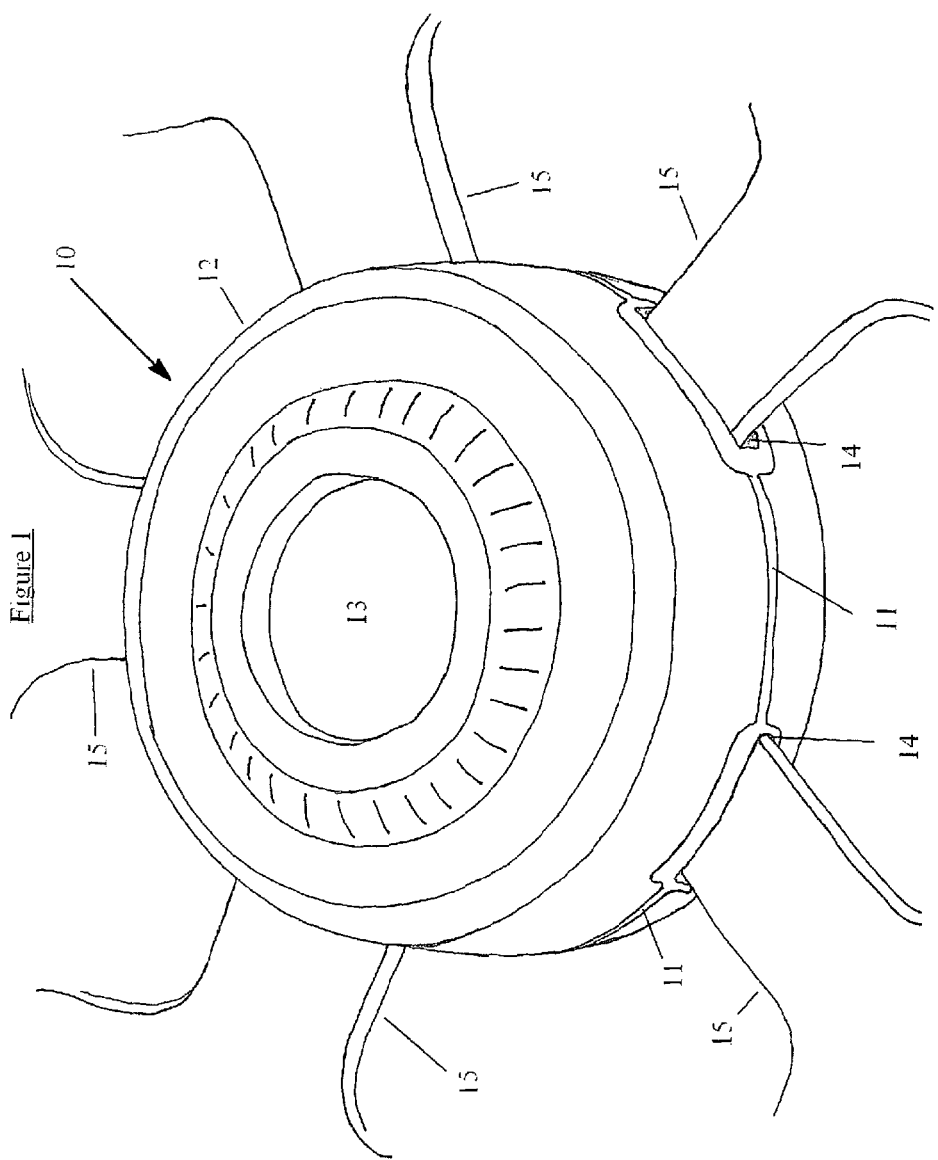
FIG. 1 is a perspective view of a safety harness buckle in accordance with a first embodiment of the present invention in use to inter-connect the ends of harness belt sections.

A buckle 10 (see FIG. 1) for a five point safety harness comprises a body portion 11 having a top cover 12 and a central release button 13.

The body 11 defines openings 14 to each of five slots which are circumferentially spaced around the periphery of the generally circular outer profile of the body. Each slot incorporates a spring loaded retainer which is operable to engage with and retain a belt end member, the belt end member being in the form of a tongue 15 provided in known manner with a retention aperture.

The body 11 supports a mechanism, described in more detail below, whereby a pre-selected four of the five tongues may be released from the buckle by depressing the central release button 13. Each slot incorporates part of an ejector spring whereby each of the four releasable tongues is positively urged out from a slot in a conventional manner when the release button is depressed to cause the retainer associated with each said slot to move to a retracted position free from direct engagement with a tongue.

Referring to FIGS. 2 to 5, a mechanism for allowing retention of belt ends, i.e. the tongues 15, and their release on operation of the release button 13, is contained in a cavity defined by the space between the body 11 and the cover 12.

The outer surface of the buckle additionally comprises a bottom plate 16 provided with apertures for screws 18 which extend through the body 11 and engage with the cover 12 such that the body is held firmly sandwiched between the cover 12 and bottom plate 16. The bottom plate serves also to define in part tongue receiving slots 17 which lie inwards of the openings 14.

Figure 6:
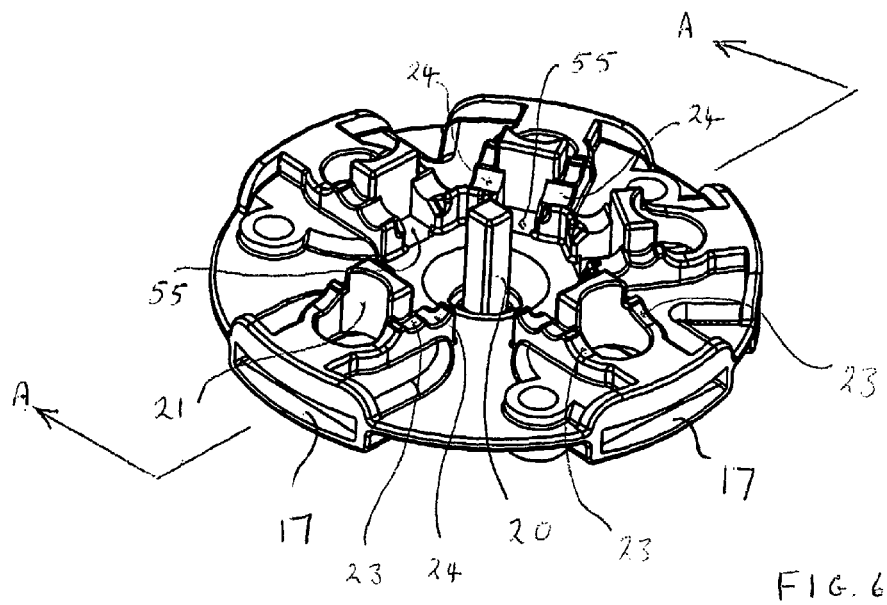
FIG. 6 is a perspective view of a support body part of the buckle mechanism.
Figure 7:
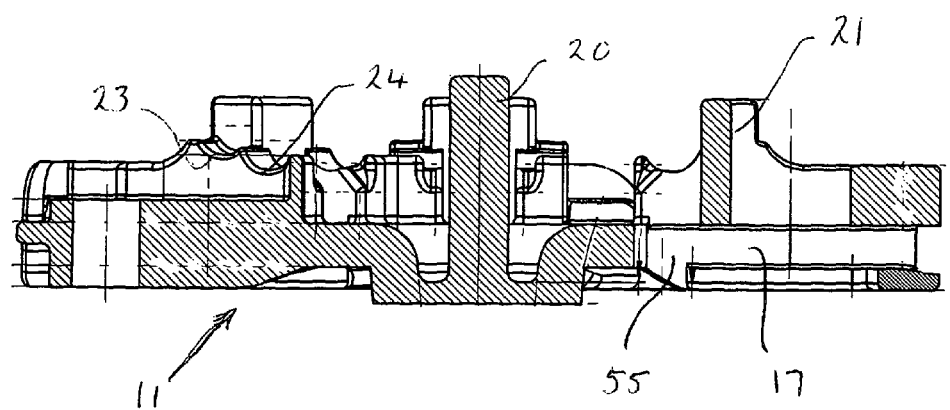
FIG. 7 is a section on the line A-A of FIG. 6.

The body 11 comprises a central pillar 20 of non-circular cross-section and five guide passages 21 (see FIGS. 6 and 7)

each positioned over a respective slot 17 for supporting a retainer in the form of a retention pin 22 (see FIG. 4).

Additionally, between each passage 21 and the central pillar 20 the body defines a pairs of fulcrum positions 23, 24 one 23 of which is spaced further from the pillar 20 than the other 24.

Each retention pin 22 (see FIGS. 8 and 9) comprises a blind bore 25 which contains a compression spring 26 (see FIG. 4) that is supported also by a post 27 formed integrally with the cover 12. The cover provides a reaction surface whereby the spring 26 urges the pin 22 in a downwards direction as viewed in FIG. 4.

Each pin 22 has an oblique end face 30 which faces towards the slot opening 14 so that insertion of a tongue 15 will cause the pin to rise upwards against the spring action and allow further insertion of the tongue until a conventional type retention aperture in the tongue aligns with the pin. The spring then urges the pin downwards into that aperture such that the rear pin face 31 prevents withdrawal of the tongue.

The outer surface of the pin is generally cylindrical but comprises a flat face 32. Each guide passage 21 has a cross-section of complementary shape, i.e. also comprising a flat section, whereby it is able to co-operate with the pin to prevent rotation of the pin and thereby ensure that the oblique end face 30 always faces towards the slot opening 14.

At the end of the pin opposite the oblique end face 30 the pin has a radially outwardly extending flange 32 which defines an annular abutment surface 33 provided for a purpose described below.

Figure 12:
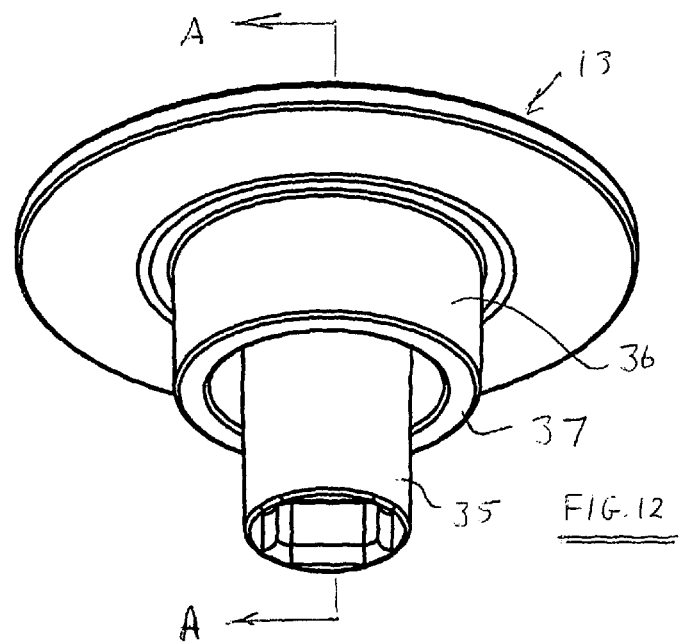
FIG. 12 is a perspective view of a release button.
Figure 13:
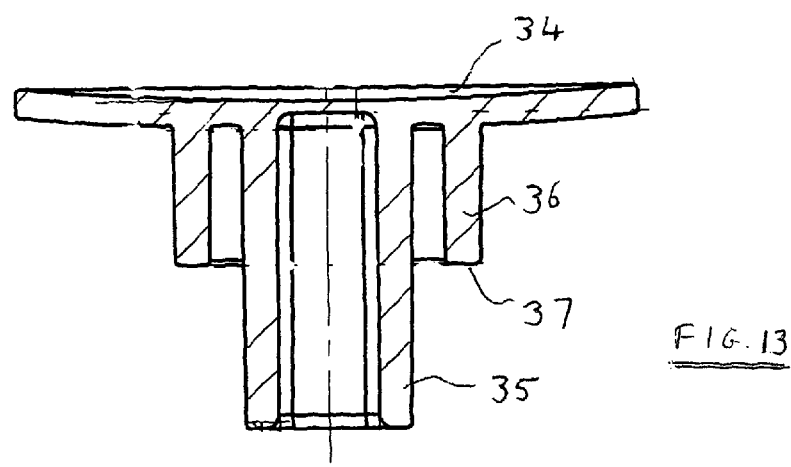
FIG. 13 is a section on the line A-A of FIG. 12.
Figure 15:
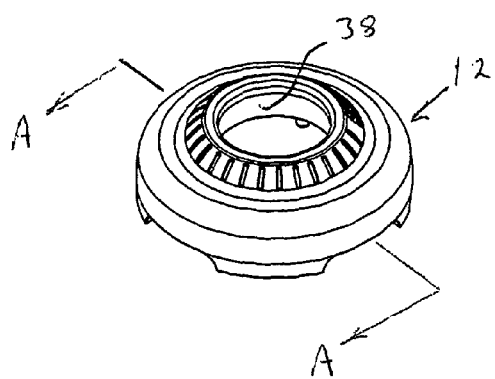
FIG. 15 is a perspective view of a top cover.
Figure 16:
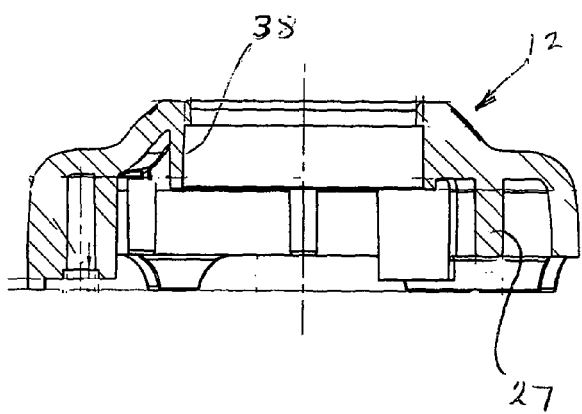
FIG. 16 is a section on the line A-A of FIG. 15.
Figure 17:
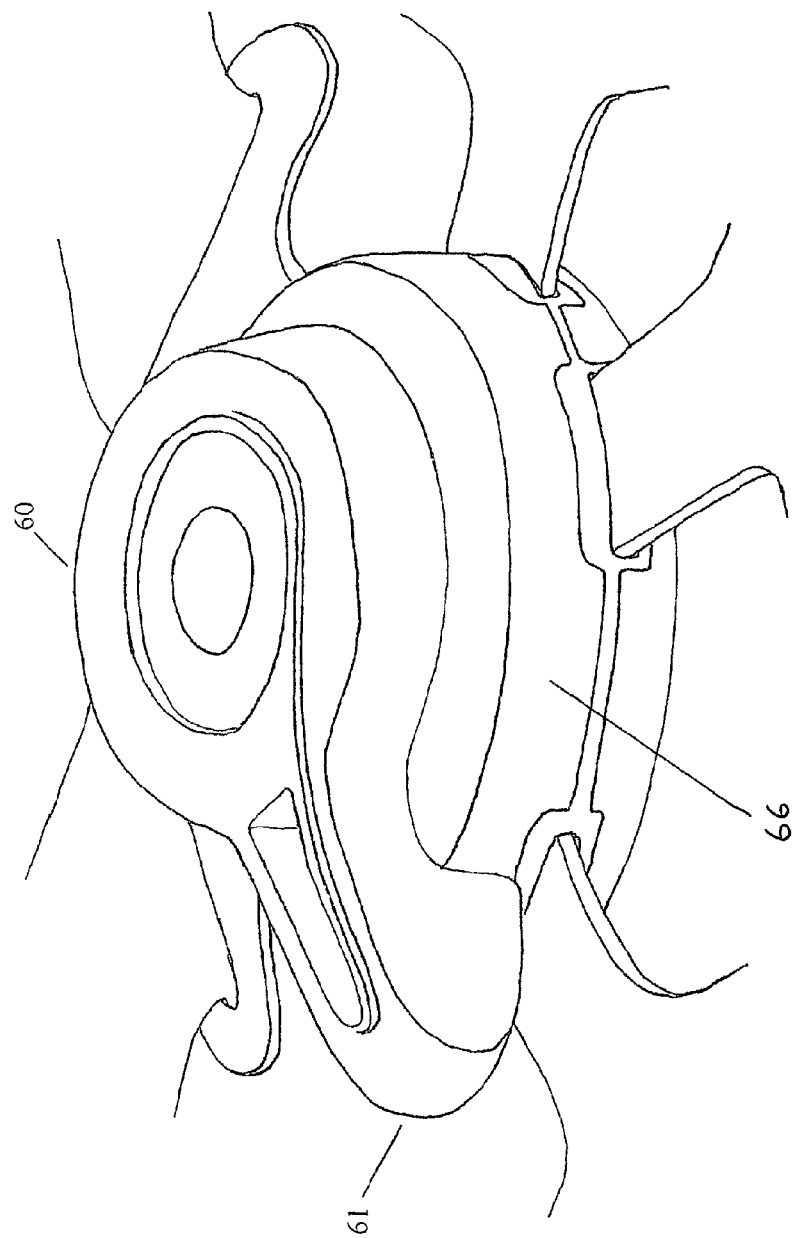
FIG. 17 is a perspective view of a safety harness buckle in accordance with a second embodiment of the present invention in use to inter-connect five harness belt ends.
Figure 18:
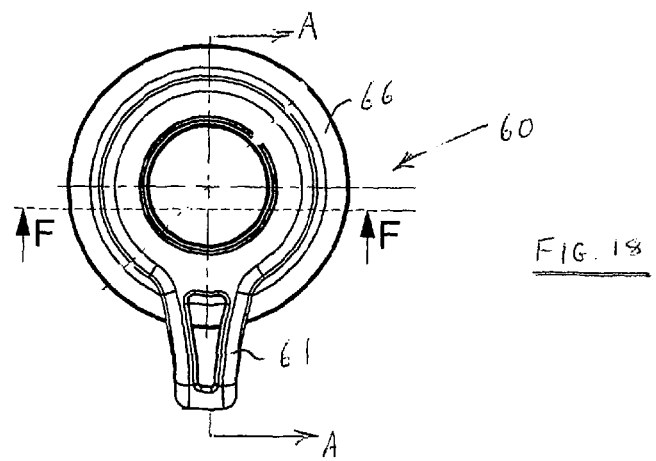
FIG. 18 is a plan view of the buckle of FIG. 17.

The aforedescribed central pillar 20 provides guidance and support for axial movement relative thereto of the release button 13. The release button 13 (see FIGS. 12 and 13) comprises a depressible end face 34, an inner tubular formation 35 having a square section bore for co-operating with the pillar 20 and a second tubular formation 36 which is of shorter axial length than the formation 35 and lies radially outwards of the formation 35. The free end of the tubular formation 36 defines an abutment surface 37. In addition to being guided by the pillar 20 of the body 11, the end face 34 is slideable axially within and support by a passage 38 defined by the top cover 12 (see also FIGS. 15 and 16).

For the purpose of operatively connecting the release button 13 with four of the five retention pins 22 four levers 40 are provided, each extending between the release button abutment surface 37 and a respective one of the four retainer pin abutment surfaces 33.

Each lever 40 (see FIGS. 10 and 11) comprises two parallel limbs 41 interconnected at respective ends 42 by a bridge section 43 which maintains the limbs spaced apart by a distance corresponding to the diameter of the generally cylindrical section of each retention pin 22.

The bridge section 43 comprises upper and lower pivot surfaces 44. The other ends 45 of each limb comprise upper and lower pivot surfaces 46.

Each limb has positioned between the ends thereof a first pivot surface 47 and a second pivot surface 48, these each being off-set from a position mid-way between the end pivot surfaces and at opposite sides of that mid-way position.

In the assembled condition the second pivot surface 48 may be positioned to rest in an inner fulcrum position 24 of the body 11 with the upper of the two pivot surfaces 44 confronting the abutment face 37 of the release button and each of the upper of the end pivot surfaces 46 confronting the annular abutment face 33 of the retention pin at diametrically opposite sides of that face.

Accordingly load applied by the release button to the lever end surface 44 is reduced at the retention pin 22 because the spacing of the surfaces 44 from the fulcrum position 24 is less than the spacing of the end surface 46 from the fulcrum position 24.

If, however, less stiff operation of the release button is preferred, each lever may simply be inverted such that the two first pivot surfaces 47 rest in the outer fulcrum positions 23, resulting in the ends 46 being closer to the fulcrum positions than the end 44 which engages with the release button abutment 37.

Figure 14:
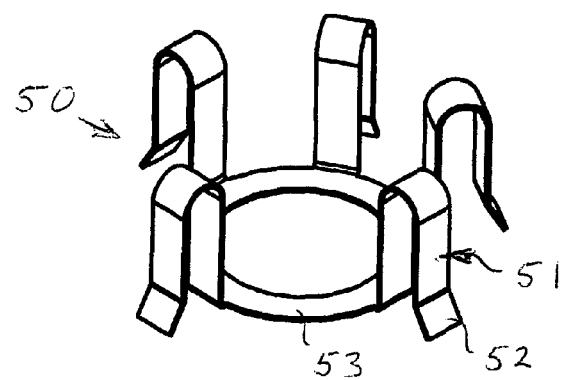
FIG. 14 is a perspective view of a ejector spring.

The aforementioned ejector spring which acts in each slot 17 is shown in FIG. 14. The spring 50 comprises five U shaped spring sections 51 and one end 52 of each section 51 lies in a slot 17. The other ends of the sections are integral with an interconnecting ring 53.

In situ in the buckle mechanism the ring 53 sits in an annular recess 54 between the bottom cover 16 and the body 11, with the limbs extending through apertures 55 in the body (see FIGS. 6 and 7).

A buckle in accordance with the second embodiment of the invention is shown in FIGS. 17 to 24. The buckle 60 (see FIGS. 18 to 20) comprises a body 11 and an arrangement of retention pins 22, levers 40, cover plate 16 and springs 26 and 50 corresponding to those of the first embodiment.

It differs however in that it has a different top cover and the release button is replaced by a cam 65 which is movable axially in the same direction as the release button, under the action of a release arm lever 61 which is secured to the top cover 66. The cam 65 is urged in an upwards direction by a compression spring 62 which encircles the pillar 20 of the body 11.

The top cover 66 supports the springs 26 of the retention pins 22 and is secured to the body 11 by screws in the same manner as in the first embodiment of the invention.

Figure 19:
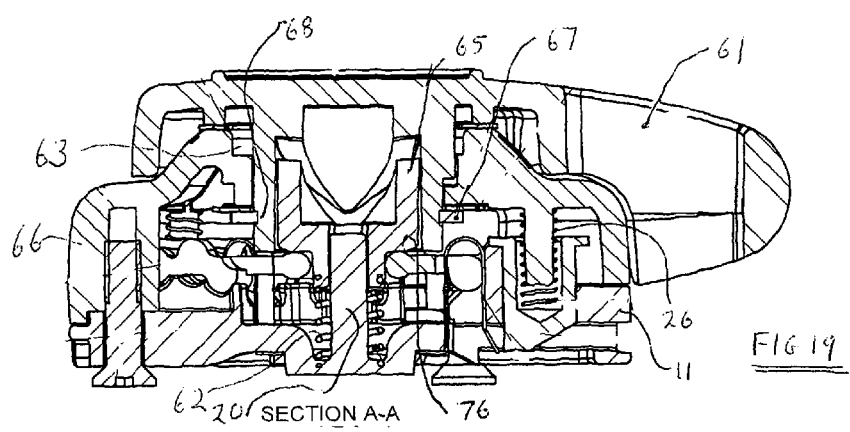
FIG. 19 is a section on the line A-A of FIG. 18 (bottom plate omitted)
Figure 20:
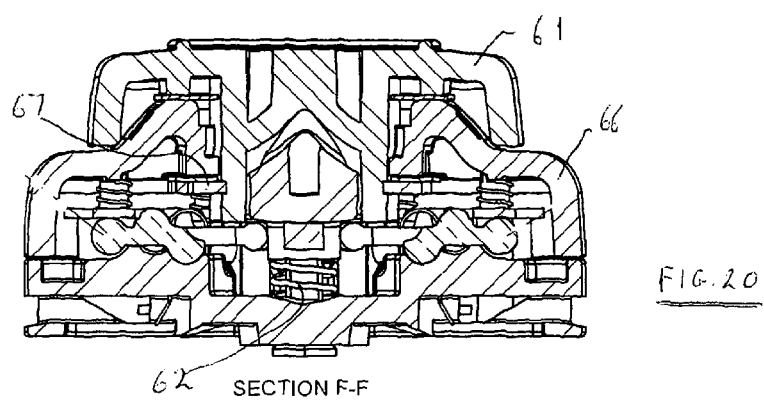
FIG. 20 is a section on the line F-F of FIG. 18.
Figure 21:
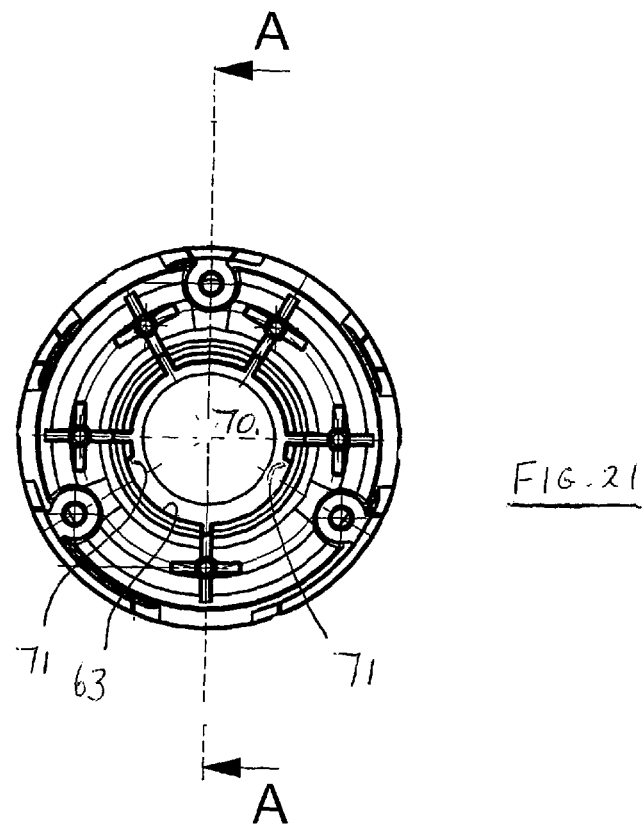
FIG. 21 is a plan view of the top cover of the buckle of FIG. 17.
Figure 22:
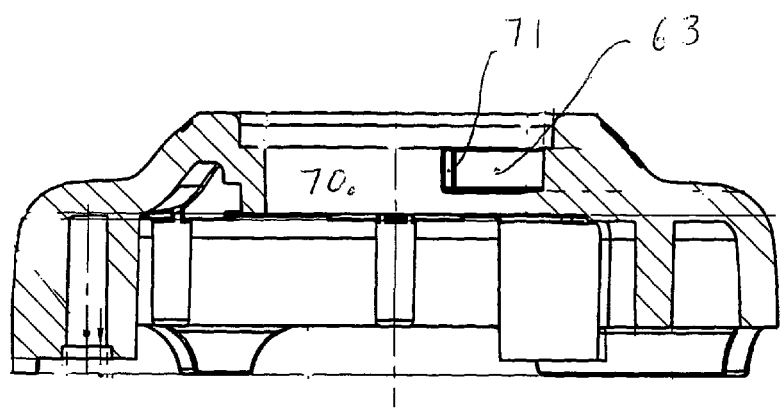
FIG. 22 is a section on the line A-A of FIG. 21.
Figure 23:
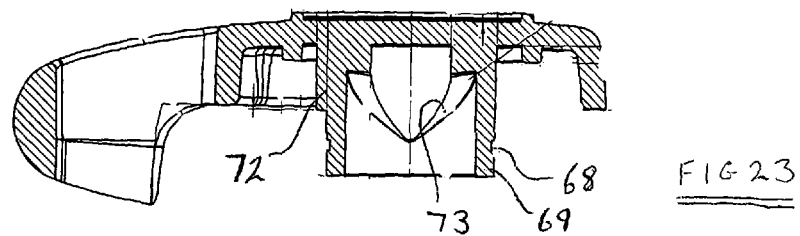
FIG. 23 is a sectional view of the release arm of the buckle of FIG. 17.
Figure 24:
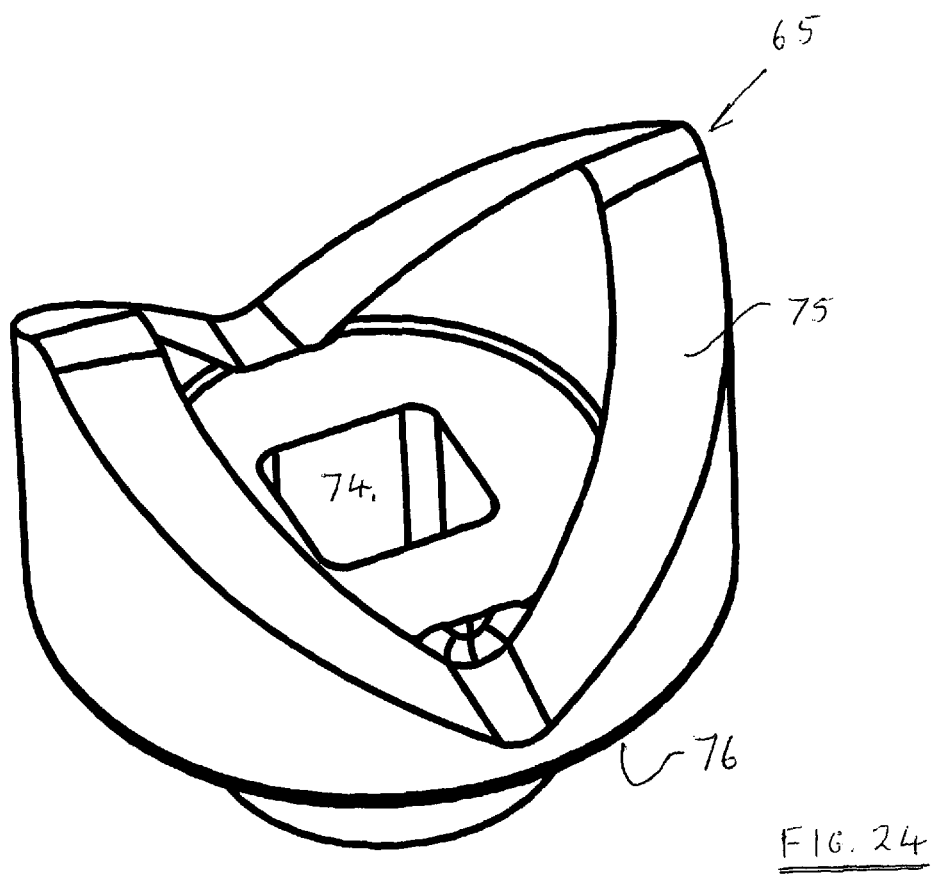
FIG. 24 is a perspective view of a cam component of the buckle of FIG. 17.

The release arm 61 is rotatably secured relative to the top cover 66 by means of circlip 67 which engages with an annular recess 68 in a tubular section 69 of the release arm (see FIGS. 19 and 23).

The top cover comprises (see FIGS. 21 and 22) a recess 63 which extends around a part of the circumference of the central opening 70 of the top cover and defines a pair of circumferentially spaced abutment faces 71 between which an abutment rib 72 of the release arm is rotatable, the abutment faces 71 being positioned so as to allow the arm to move clockwise or counter clockwise through approximately 40 degrees from the datum position.

The release arm comprises a cam formation 73 which co-operates with the cam 65. The cam 65 is provided with a central aperture 74 of square section whereby it is non-rotatably supported by the body 11. In consequence, under the action of the spring 62 which urges the cam surfaces 75 to engage with the cam formation 73 the release arm is normally biased to the datum position as determined by the cam profiles.

Rotation of the release arm 61 causes the cam 65 to be forced downwards against the action of the spring 62. In consequence an annular abutment face 76 of the cam 75 acts on the inner ends of the levers in the same manner as the abutment face 37 of the release button 12 thereby to effect release of the belt end tongues from the buckle slots.

The invention claimed is:

1. A buckle for use with a safety harness, said buckle comprising:
   a plurality of slots each for receiving an end of a harness belt section,
   each slot having associated therewith a retainer for engagement with an abutment surface defined by the end of the belt section, at least some of said retainers each having associated therewith a respective one of a plurality of first bias means normally to urge the retainers each to reside at a position at which they each engage with a said abutment surface of the end of the belt section following insertion into a slot of the plurality of slots, at least one of said retainers being non-retractable and some of said retainers being retractable, a plurality of said retractable retainers each having associated therewith a lever which is pivotable against an action of a respective one of the first bias means to move the retainer to a release position at which the retainer is free from engagement with a said abutment surface, an actuation member operable to act on each lever whereby each lever is caused to move a retractable retainer to said release position, and each said retractable retainer being positioned to act in the slot of the plurality of slots, which has associated therewith ejector means that is arranged positively to eject a belt end from the slot when the retainer at that slot is moved to a release position, wherein the actuation member is moveable axially in a direction parallel with movement of the retainers under the action of the first bias means.

2. The buckle according to claim 1, wherein the actuation member is operable to act simultaneously on each of a plurality of levers.

3. The buckle according to claim 1, wherein each lever is independently removable from the buckle.

4. The buckle according to claim 1, wherein the first bias means acts via a said lever to bias the actuation member in a first direction.

5. The buckle according to claim 4, wherein said first direction is opposite and parallel with a direction in which the retainers move to engage with the abutment surface of the end of the belt section.

6. The buckle according to claim 1, wherein ends of a lever bear against abutment surfaces defined by the retainer and actuation member without being pivotally secured relative thereto.

7. The buckle according claim 1, and comprising second bias means provided to act on the actuation member to provide a bias force which tends to resist movement of the actuation member away from a datum position and towards a position at which a retainer is caused, via a lever, to move into the release position.

8. The buckle according to claim 1, wherein ends of a lever are secured pivotally to the actuation member and/or a retainer whereby movement of an end of the lever corresponds with movement of the actuation member and/or retainer which is pivotally secured thereto.

9. The buckle according to claim 1, wherein a body portion defines in part said slots.

10. The buckle according to claim 1, wherein a body portion provides a fulcrum for pivotal movement of a pivot position of a lever.

11. The buckle according to claim 1, wherein a lever comprises a pivot position off-set from a position mid-way between operative ends of the lever.

12. The buckle according to claim 1, wherein a body portion defines two fulcrum positions whereby reversal of orientation of a lever and positioning of a lever in a different one of two fulcrum positions enables forces exerted on a retainer for a given force on the actuation member to be changed.

13. The buckle according to claim 1, wherein a lever is provided with two pivot positions each off-set from a position midway between operative ends of the lever and either of which is positionable in a fulcrum position or one of two or more fulcrum positions thereby to enable a force exerted on a retainer for a given force of the actuation member to be changed.

14. A buckle for use with a safety harness, said buckle comprising:
    a plurality of slots each for receiving an end of a harness belt section,
    each slot having associated therewith a retainer for engagement with an abutment surface defined by the end of the belt section,
    at least some of said retainers each having associated therewith a respective one of a plurality of first bias means normally to urge the retainers each to reside at a position at which they each engage with a said abutment surface of the end of the belt section following insertion into a slot of the plurality of slots,
    at least one of said retainers being non-retractable and some of said retainers being retractable,
    a plurality of said retractable retainers each having associated therewith a lever which is pivotable against an action of a respective one of the first bias means to move the retainer to a release position at which the retainer is free from engagement with a said abutment surface,
    an actuation member operable to act on each lever whereby each lever is caused to move a retractable retainer to said release position, and
    each said retractable retainer being positioned to act in the slot of the plurality of slots, which has associated therewith ejector means that is arranged positively to eject a belt end from the slot when the retainer at that slot is moved to a release position,
    wherein the each lever is of a first class type.

15. A buckle for use with a safety harness, said buckle comprising:
    a plurality of slots each for receiving an end of a harness belt section,
    each slot having associated therewith a retainer for engagement with an abutment surface defined by the end of the belt section,
    at least some of said retainers each having associated therewith a respective one of a plurality of first bias means normally to urge the retainers each to reside at a position at which they each engage with a said abutment surface of the end of the belt section following insertion into a slot of the plurality of slots,
    at least one of said retainers being non-retractable and some of said retainers being retractable,
    a plurality of said retractable retainers each having associated therewith a lever which is pivotable against an action of a respective one of the first bias means to move the retainer to a release position at which the retainer is free from engagement with a said abutment surface,
    an actuation member operable to act on each lever whereby each lever is caused to move a retractable retainer to said release position, and
    each said retractable retainer being positioned to act in the slot of the plurality of slots, which has associated therewith ejector means that is arranged positively to eject a belt end from the slot when the retainer at that slot is moved to a release position,
    wherein a release arm is provided, said release arm being angularly rotatable about a central pivot axis parallel with a direction of movement of the actuation member.

16. The buckle according to claim 15, wherein a cam mechanism is provided between the release arm and actuation member to convert rotation of the release arm into axial movement of the actuation member.

17. The buckle according to claim 16, wherein the cam mechanism allows the arm to be rotated through an initial angle of clockwise or anti-clockwise movement without causing any axial movement of the actuation member, or any axial movement sufficient to move a retainer to retracted position, and to move the actuation member axially and effect movement of a retainer to a retracted position only when the arm is moved from a datum position through more than that initial angle.

18. The buckle according to claim 15, and comprising release arm bias means to bias the arm to a datum position from which it is rotatable either clockwise or anti-clockwise against a bias force.

* * * * *